(12) United States Patent
Di Fiore et al.

(10) Patent No.: US 10,717,592 B2
(45) Date of Patent: Jul. 21, 2020

(54) CAPSULE FOR PREPARING INFUSION OR SOLUBLE BEVERAGES

(71) Applicant: COSSA POLIMERI S.R.L., Gorla Maggiore (VA) (IT)

(72) Inventors: Carmine Di Fiore, Gorla Maggiore (IT); Santolo Taglialatela Scafati, Gorla Maggiore (IT); Davide Filomeno, Gorla Maggiore (IT)

(73) Assignee: COSSA PALIMERI S.R.L., Gorla Maggiore (VA) (IT)

( * ) Notice: Subject to any disclaimer, the term of this patent is extended or adjusted under 35 U.S.C. 154(b) by 227 days.

(21) Appl. No.: 15/771,682

(22) PCT Filed: Oct. 27, 2016

(86) PCT No.: PCT/IT2016/000256
§ 371 (c)(1),
(2) Date: Apr. 27, 2018

(87) PCT Pub. No.: WO2017/072808
PCT Pub. Date: May 4, 2017

(65) Prior Publication Data
US 2018/0305116 A1 Oct. 25, 2018

(30) Foreign Application Priority Data
Oct. 30, 2015 (IT) .............................. UB2015A5347

(51) Int. Cl.
B65D 85/804 (2006.01)
(52) U.S. Cl.
CPC ......... *B65D 85/8043* (2013.01); *Y02W 90/13* (2015.05); *Y02W 90/14* (2015.05)

(58) Field of Classification Search
CPC ........... B65D 85/8043; B65D 85/8046; Y02W 90/14; Y02W 90/13; A47J 31/407
See application file for complete search history.

(56) References Cited

U.S. PATENT DOCUMENTS

2010/0260896 A1 10/2010 Yoakim et al.
2014/0335236 A1 11/2014 Footz
(Continued)

FOREIGN PATENT DOCUMENTS

| WO | 2011/015973 | 2/2011 | |
|---|---|---|---|
| WO | WO-2011015973 A1 * | 2/2011 | ........... B65D 65/466 |
| WO | 2014/126463 | 8/2014 | |

OTHER PUBLICATIONS

English translation of WO2011015973 (Year: 2011).*

*Primary Examiner* — Jun S Yoo
(74) *Attorney, Agent, or Firm* — Clark & Brody LP

(57) ABSTRACT

A capsule (1) is described, for preparing infusion or soluble beverages, in particular coffee or milk or chocolate, comprising at least one containing body (2) made of a compostabile/biodegradabile and or material having at least one base (3) and at least one opening (4) opposite to the base (3) and adapted to be closed by least one cover (5), the containing body (2) comprising at least one internal volume (V) adapted to contain at least one substance to be infused or solubilized, the cover (5) being made by overlapping at least one first layer (5*a*) composed of at least one compostabile/biodegradabile and or polyester and of at least one second, insulating inert layer (5*b*) made of a compostabile/biodegradabile and or material, wherein the first layer (5*a*) is interposed between the second layer (5*b*) and the internal volume (V).

15 Claims, 1 Drawing Sheet

(56) References Cited

U.S. PATENT DOCUMENTS

| | | | |
|---|---|---|---|
| 2015/0225099 A1* | 8/2015 | Villain | B65B 7/164 |
| | | | 426/115 |
| 2016/0068335 A1* | 3/2016 | Kamerbeek | A47J 31/407 |
| | | | 426/115 |
| 2017/0008694 A1* | 1/2017 | Andreae | B65D 65/466 |

* cited by examiner

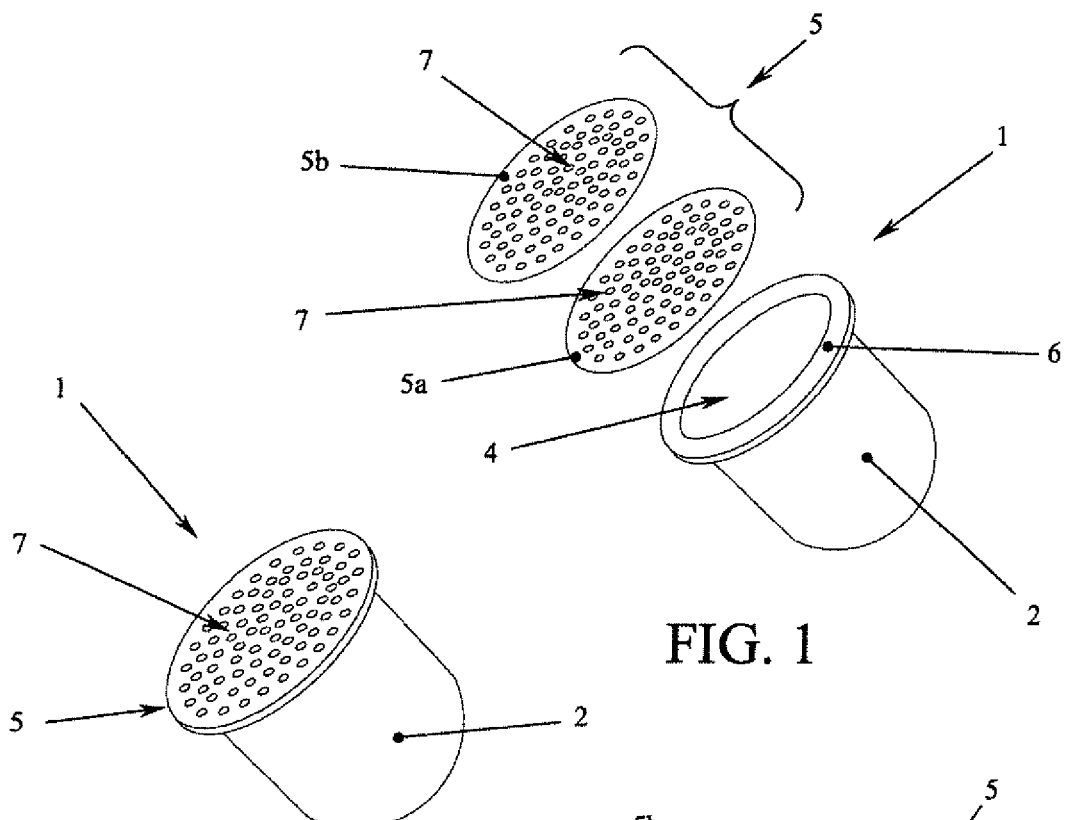
FIG. 1
FIG. 2
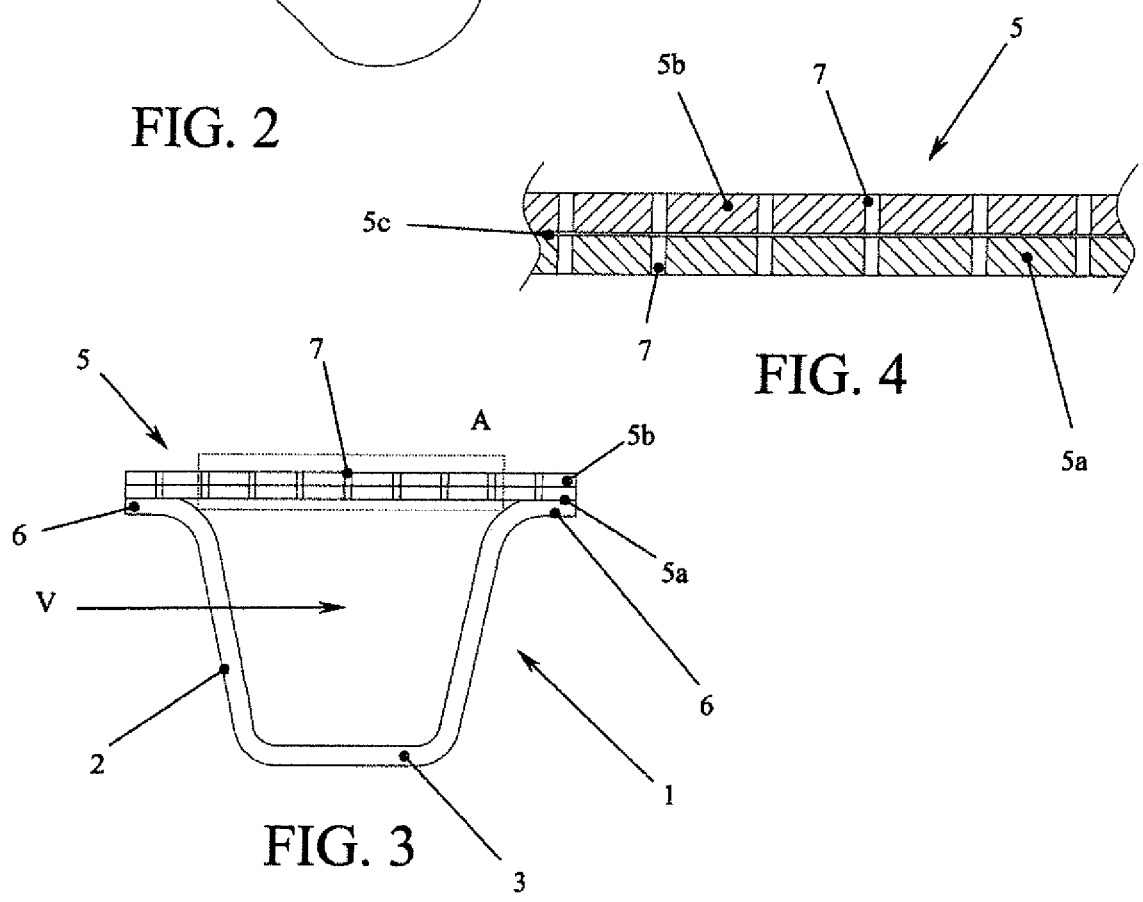
FIG. 4
FIG. 3

CAPSULE FOR PREPARING INFUSION OR SOLUBLE BEVERAGES

BACKGROUND OF THE INVENTION

1) Field of the Invention

The present invention refers to a capsule for preparing infusion or soluble beverages.

2) Background Art

As known, the prior art proposes a wide variety of automatic or semi-automatic machines equipped with a preparing and delivering assembly adapted to produce an infusion through the passage of hot water (or other liquid suitable to be used) through a capsule containing the essence to be infused or solubilized, such as for example tea, coffee, tisane, milk, chocolate, etc.

In particular, known capsules which are neither biodegradable nor compostable are a disposable pre-packaged dose of the substance to be infused or solubilized enclosed inside a container made of plastic material closed by a coverage made of plastic or an aluminium foil.

The wide use of such capsules, however, is having a strong environmental cost, though after being used the capsules themselves contain therein an amount of coffee powder which could be easily compostable, since they must unavoidably be disposed of in a tip.

In order to solve such inconvenience, the prior art is trying to propose some solutions of capsules made of biodegradable and/or compostable materials.

The majority of such capsules however, though being composed of a containing body made of a compostabile/biodegradabile and or material, continue to use the closure through the cover composed of a protecting layer of aluminium which, as known, is neither biodegradable nor compostable, thereby not allowing to obtain wholly biodegradable and/or compostable capsules in all respects.

Some capsules instead have closing layers composed of a plurality of films joined together through gluing substances, resulting again not wholly biodegradable or compostable in all respects.

However, the replacement of the non-biodegradable closing layer with a layer of material which is also compostable or biodegradable is a technically very delicate operation: in fact, it has been detected that, so far, known compostable materials are particularly sensible to relatively high temperatures and, consequently, the use of such materials for making the above closing layer would generate technologic closing problems, since the thermo-welding punch of such a layer could remain glued onto the capsule, at its own operating temperature.

SUMMARY OF THE INVENTION

Therefore, object of the present invention is solving the above prior art problems by providing a capsule for preparing infusion and soluble beverages, in particular coffee, which is easier to make with respect to prior art capsules, though being wholly compostabile/biodegradabile and or.

Another object of the present invention is solving the above prior art problems by providing a capsule for preparing infusion and soluble beverages which allows an easier thermo-welding operation of its own closing cover onto the capsule itself, avoiding any gluing problem of the related welding punch.

The above and other objects and advantages of the invention, as will result from the following description, are obtained with a capsule for preparing infusion beverages as claimed in claim 1. Preferred embodiments and non-trivial variations of the present invention are the subject matter of the dependent claims.

It is intended that all enclosed claims are an integral part of the present description.

It will be immediately obvious that numerous variations and modifications (for example related to shape, sizes, arrangements and parts with equivalent functionality) could be made to what is described, without departing from the scope of the invention as appears from the enclosed claims.

BRIEF DESCRIPTION OF THE DRAWINGS

The present invention will be better described by some preferred embodiments thereof, provided as a non-limiting example, with reference to the enclosed drawings, in which:

FIG. 1 shows a perspective and partially exploded view of a preferred embodiment of the capsule according to the present invention;

FIG. 2 shows a perspective view of the assembled capsule of FIG. 1;

FIG. 3 shows a longitudinally sectioned view of the capsule according to the present invention; and FIG. 4 shows an enlarged view of the detail contained in box A of FIG. 3.

DETAILED DESCRIPTION OF PREFERRED EMBODIMENTS

With reference to the Figures, it is possible to note that the capsule 1 according to the present invention for preparing infusion or soluble beverages, in particular coffee or milk or chocolate, comprises at least one containing body 2 made of compostabile/biodegradabile and or material, having at least one base 3 and at least one opening 4 opposite to such base 3 and adapted to be closed by at least one cover 5, such containing body 2 comprising at least one internal volume V adapted to contain at least one substance to be infused or solubilized, typically of a granular or powder form.

Advantageously, the cover 5 is made by overlapping at least one first layer 5a composed of at least one compostable and/or biodegradable polyester or of a mixture of many compostabile/biodegradabile and or polyesters, and of at least one second, insulating inert layer 5b made of a compostabile/biodegradabile and or material, wherein the first layer 5a is interposed between the second layer 5b, for example exposed towards outside the capsule 1, and the internal volume V.

As described above, the second, insulating inert layer 5b, during the common thermo-welding steps of the cover 5 onto the perimeter edge 6 of the opening 4 of the capsule 1 according to the present invention, is interposed between the first, thermally sensitive layer 5a, and the welding punch, consequently avoiding any chance of gluing of the first layer 5a.

Still more advantageously, the compostabile/biodegradabile and or material of the second, insulating inert layer 5b is at least one fibrous material: preferably, such fibrous material can then be paper and, still more preferably, pure cellulose paper.

Preferably, moreover, the first layer 5a and the second layer 5b are mutually connected only through at least one thereto-welding interface 5c, without the use of any type of external gluing substance, consequently making also the cover 5 of the capsule 1 according to the present invention wholly compostabile/biodegradabile and or in all respects.

Advantageously, the cover 5 can further be equipped with a plurality of openings 7, such as for example holes or micro-holes, passing through at least such first layer 5a and second layer 5b.

Preferably, the number per cm$^2$ of such openings 7 is included between 2 and 50, more preferably between 5 and 30, still more preferably between 10 and 20.

Preferably, the diameter of such openings 7 is included between 0.2 cm and 1 cm, more preferably between 0.3 cm and 0.7 cm, still more preferably between 0.35 cm and 0.55 cm.

Advantageously, the number per cm$^2$ and the diameter of the openings 7 are combined in order to have a delivery time preferably included between 5 s and 50 s, more preferably between 10 s and 30 s, still more preferably between 12 s and 25 s.

Preferably, the thickness of the cover 5 of the capsule 1 according to the present invention is included between 25 μm and 600 μm, more preferably between 100 μm and 300 μm, still more preferably between 140 μm and 240 μm, while the thickness of the second layer 5b is included between 0.005 μm and 50 μm, more preferably between 0.05 μm and 25 μm, still more preferably between 0.5 μm and 20 μm.

Obviously, the cover 5 of the capsule 1 according to the present invention could further comprise one or more further layers, in addition to the first layer 5a and to the second layer 5b, also made of an adequate compostable and/or biodegradable material to increase the barrier to aromas and oxygen.

The capsule 1 according to the present invention, though being wholly composed of compostable and/or biodegradable materials, has a behaviour wholly equal to currently used capsules, and can be disposed of together with its contents in the domestic humid fraction, without particular problems and be conferred to normal composting plants, resulting also in compliance with the technical composting standard UNI EN 13432.

The invention claimed is:

1. A capsule for preparing infusion or soluble beverages comprising:
    at least one containing body made of a compostable and/or biodegradable material having at least one base and at least one opening opposite to said base and adapted to be closed by at least one cover,
    said containing body further comprising at least one internal volume (V) adapted to contain at least one substance to be infused or solubilized,
    said at least one cover being made by overlapping at least one first layer composed of at least one compostable and/or biodegradable polyester and being thermally sensitive and at least one second insulating inert layer made of a compostable and/or biodegradable material, wherein said first layer is interposed between said second insulating inert layer and said internal volume (V),
    characterized in that said compostable and/or biodegradable material of said second insulating inert layer is paper, and said first layer and said second insulating inert layer are mutually connected through at least one thermowelding interface, without the use of an external gluing substance, consequently making also the at least one cover of the capsule wholly compostable and/or biodegradable, the second insulating inert layer, during the common thermowelding steps of the at least one cover onto a perimeter edge of the opening of the capsule being interposed between the at least one first layer, and a welding punch, consequently avoiding any chance of gluing of the first layer.

2. The capsule of claim 1, wherein the cover is equipped with a plurality of openings passing through at least the first layer and second layer.

3. The capsule of claim 2, wherein a number per cm$^2$ of the openings is between 2 and 50.

4. The capsule of claim 3, wherein a diameter of the openings is between 0.2 cm and 1 cm.

5. The capsule of claim 4, wherein the diameter f the openings is between 0.3 cm and 0.7 cm.

6. The capsule of claim 5, wherein the diameter of the openings is between 0.35 cm and 0.55 cm.

7. The capsule of claim 3, wherein the number per cm$^2$ and diameter of the openings are combined in order to have a delivery time between 5 s and 50 s.

8. The capsule of claim 7, wherein the number per cm$^2$ and diameter of the openings are combined in order to have a delivery time between 10 s and 30 s.

9. The capsule of claim 8, wherein the number per cm$^2$ and diameter of the openings are combined in order to have a delivery time between 12 s and 25 s.

10. The capsule of claim 3, wherein the number per cm$^2$ of the openings is between 5 and 30.

11. The capsule of claim 10, wherein the number per cm$^2$ of the openings is between 10 and 20.

12. The capsule of claim 1, wherein a thickness of the cover is between 25 μm and 600 μm, and a thickness of the second layer is between 0.005 μm and 50 μm.

13. The capsule of claim 12, wherein the thickness of the cover is between 100 μm and 300 μm and a thickness of the second insulating inert layer is between 0.05 μm and 25 μm.

14. The capsule of claim 13, wherein the thickness of the cover is between 140 μm and 240 μm, and the thickness of the second insulating inert layer is between 0.5 μm and 20 μm.

15. The capsule of claim 13, wherein the paper is pure cellulose paper.

\* \* \* \* \*

UNITED STATES PATENT AND TRADEMARK OFFICE
CERTIFICATE OF CORRECTION

PATENT NO. : 10,717,592 B2
APPLICATION NO. : 15/771682
DATED : July 21, 2020
INVENTOR(S) : Di Fiore et al.

Page 1 of 1

It is certified that error appears in the above-identified patent and that said Letters Patent is hereby corrected as shown below:

On the Title Page

Item (73), should read:
--COSSA POLIMERI S.R.L.--

Signed and Sealed this
Twenty-seventh Day of October, 2020

Andrei Iancu
*Director of the United States Patent and Trademark Office*